US011210627B1

(12) United States Patent
Marolia et al.

(10) Patent No.: US 11,210,627 B1
(45) Date of Patent: Dec. 28, 2021

(54) MONITORING VEHICLE ACTIVITY AND COMMUNICATING INSIGHTS FROM VEHICLES AT AN AUTOMOBILE DEALERSHIP

(71) Applicant: Spireon, Inc., Irvine, CA (US)

(72) Inventors: Sunil B. Marolia, Laguna Niguel, CA (US); Ben Tran, Yorba Linda, CA (US); Bill Stephenson, Ladera Ranch, CA (US); Dave Withers, Tustin, CA (US); Kousar Syed, Telangana (IN)

(73) Assignee: Spireon, Inc., Irvine, CA (US)

( * ) Notice: Subject to any disclaimer, the term of this patent is extended or adjusted under 35 U.S.C. 154(b) by 509 days.

(21) Appl. No.: 16/246,936

(22) Filed: Jan. 14, 2019

Related U.S. Application Data

(60) Provisional application No. 62/618,120, filed on Jan. 17, 2018.

(51) Int. Cl.
| | |
|---|---|
| *G06Q 10/00* | (2012.01) |
| *G06Q 10/08* | (2012.01) |
| *H04W 4/44* | (2018.01) |
| *H04W 4/021* | (2018.01) |
| *G08G 1/00* | (2006.01) |

(52) U.S. Cl.
CPC .......... *G06Q 10/087* (2013.01); *G08G 1/205* (2013.01); *H04W 4/021* (2013.01); *H04W 4/44* (2018.02)

(58) Field of Classification Search
CPC ...... G06Q 10/087; H04W 4/44; H04W 4/021; G08G 1/205

USPC .......................................................... 705/28
See application file for complete search history.

(56) References Cited

U.S. PATENT DOCUMENTS

| | | | |
|---|---|---|---|
| 6,025,774 | A | 2/2000 | Forbes |
| 6,249,217 | B1 | 6/2001 | Forbes |
| 7,102,510 | B2 | 9/2006 | Boling et al. |
| 7,215,282 | B2 | 5/2007 | Boling et al. |

(Continued)

FOREIGN PATENT DOCUMENTS

| | | |
|---|---|---|
| CA | 2683208 A1 | 11/2008 |
| CA | 2837320 A1 | 11/2012 |

(Continued)

*Primary Examiner* — Naomi J Small
(74) *Attorney, Agent, or Firm* — Luedeka Neely Group, P.C.

(57) ABSTRACT

An apparatus for managing information regarding an inventory of vehicles on an automobile dealership lot includes vehicle tracking devices installed in the vehicles. The tracking devices utilize a GPS receiver for generating vehicle location data and an accelerometer for generating vehicle motion data. Data from the vehicle tracking devices are received by a central server that uses the data to determine whether a vehicle is on a test drive, the identity of a salesperson who is with the vehicle, and the estimated time that the vehicle will return to the dealership. Preferred embodiments establish a geofence around the dealership location, detect when vehicles exit and reenter the geofence, and communicate the exit/return events back to the central server. The central server communicates the information to smartphones of dealership personnel to indicate availability of a particular vehicle. Some embodiments also aggregate the information from multiple sensors to report on key metrics for optimizing dealer sales performance.

20 Claims, 6 Drawing Sheets

(56) References Cited

U.S. PATENT DOCUMENTS

| | | | |
|---|---|---|---|
| 7,366,551 B1 | 4/2008 | Hartley | |
| 7,546,151 B2 | 6/2009 | Hartley | |
| 7,675,423 B2 | 3/2010 | Boling et al. | |
| 7,818,098 B2 | 10/2010 | Koepf et al. | |
| 7,830,305 B2 | 11/2010 | Boling et al. | |
| 7,970,496 B2 | 6/2011 | Koepf et al. | |
| 8,018,332 B2 | 9/2011 | Boling et al. | |
| 8,368,561 B2 | 2/2013 | Welch et al. | |
| 8,452,673 B2 | 5/2013 | Boling et al. | |
| 8,462,021 B2 | 6/2013 | Welch et al. | |
| 8,510,200 B2 | 8/2013 | Pearlman et al. | |
| 8,760,274 B2 | 6/2014 | Boling et al. | |
| 8,933,802 B2 | 1/2015 | Baade | |
| 9,008,894 B2 | 4/2015 | Bishop et al. | |
| 9,060,213 B2 | 6/2015 | Jones | |
| 9,070,271 B2 | 6/2015 | Baade et al. | |
| 9,316,737 B2 | 4/2016 | Baade | |
| 9,332,404 B2 | 5/2016 | Boling et al. | |
| 9,516,394 B2 | 12/2016 | Carlo et al. | |
| 9,551,788 B2 | 1/2017 | Epler | |
| 9,779,379 B2 | 10/2017 | Hall et al. | |
| 9,779,449 B2 | 10/2017 | Meyer et al. | |
| 9,911,151 B1 * | 3/2018 | Gordon | G06Q 20/203 |
| 10,089,598 B2 | 10/2018 | Reeder et al. | |
| 10,169,822 B2 | 1/2019 | Jarvis et al. | |
| 10,223,744 B2 | 3/2019 | Brady et al. | |
| 10,232,823 B1 | 3/2019 | Bobay et al. | |
| 10,255,824 B2 | 4/2019 | Pearlman et al. | |
| 2005/0026627 A1 | 2/2005 | Boling et al. | |
| 2005/0215194 A1 | 9/2005 | Boling et al. | |
| 2006/0007038 A1 | 1/2006 | Boling et al. | |
| 2007/0152844 A1 | 7/2007 | Hartley et al. | |
| 2008/0147245 A1 | 6/2008 | Koepf et al. | |
| 2008/0186135 A1 | 8/2008 | Boling et al. | |
| 2008/0198018 A1 | 8/2008 | Hartley | |
| 2008/0287151 A1 | 11/2008 | Fjelstad et al. | |
| 2009/0043445 A1 | 2/2009 | Bishop et al. | |
| 2009/0224966 A1 | 9/2009 | Boling et al. | |
| 2010/0103042 A1 | 4/2010 | Bishop et al. | |
| 2010/0299020 A1 | 11/2010 | Koepf et al. | |
| 2011/0016514 A1 | 1/2011 | Carlo et al. | |
| 2011/0093159 A1 * | 4/2011 | Boling | G06Q 10/087 701/29.6 |
| 2011/0241903 A1 | 10/2011 | Welch et al. | |
| 2012/0299721 A1 | 11/2012 | Jones | |
| 2012/0299755 A1 | 11/2012 | Jones | |
| 2013/0088371 A1 | 4/2013 | Welch et al. | |
| 2013/0127617 A1 | 5/2013 | Baade et al. | |
| 2013/0141249 A1 | 6/2013 | Pearlman et al. | |
| 2013/0144770 A1 | 6/2013 | Boling et al. | |
| 2013/0144771 A1 | 6/2013 | Boling et al. | |
| 2013/0144805 A1 | 6/2013 | Boling et al. | |
| 2013/0147617 A1 | 6/2013 | Boling et al. | |
| 2013/0159214 A1 | 6/2013 | Boling et al. | |
| 2013/0185193 A1 | 7/2013 | Boling et al. | |
| 2013/0302757 A1 | 11/2013 | Pearlman et al. | |
| 2014/0012634 A1 | 1/2014 | Pearlman et al. | |
| 2014/0052605 A1 | 2/2014 | Beerle et al. | |
| 2014/0074692 A1 | 3/2014 | Beerle et al. | |
| 2014/0095061 A1 | 4/2014 | Hyde | |
| 2014/0125500 A1 | 5/2014 | Baade | |
| 2014/0125501 A1 | 5/2014 | Baade | |
| 2014/0280658 A1 | 9/2014 | Boling et al. | |
| 2015/0006207 A1 | 1/2015 | Jarvis et al. | |
| 2015/0019270 A1 | 1/2015 | Jarvis et al. | |
| 2015/0024727 A1 | 1/2015 | Hale-Pletka et al. | |
| 2015/0066362 A1 | 3/2015 | Meyer et al. | |
| 2015/0067312 A1 | 3/2015 | Lewandowski et al. | |
| 2015/0095255 A1 | 4/2015 | Hall et al. | |
| 2015/0186991 A1 | 7/2015 | Meyer et al. | |
| 2015/0193726 A1 * | 7/2015 | Simmons | G06Q 10/087 705/28 |
| 2015/0332592 A1 * | 11/2015 | Cooper | H04W 4/02 340/989 |
| 2015/0356497 A1 | 12/2015 | Reeder et al. | |
| 2016/0225072 A1 | 8/2016 | Brady et al. | |
| 2016/0282466 A1 | 9/2016 | Epler | |
| 2017/0262717 A1 | 9/2017 | Drazan et al. | |
| 2018/0300967 A1 | 10/2018 | Winograd | |
| 2018/0352198 A1 | 12/2018 | Raasch et al. | |
| 2019/0005442 A1 | 1/2019 | Reeder et al. | |
| 2019/0061692 A1 | 2/2019 | Bobay et al. | |
| 2020/0200918 A1 * | 6/2020 | Wascow | B60R 16/03 |

FOREIGN PATENT DOCUMENTS

| | | |
|---|---|---|
| CA | 2856796 A1 | 5/2013 |
| CA | 2867447 A1 | 9/2013 |
| CA | 2826902 A1 | 3/2014 |
| CA | 2828835 A1 | 4/2014 |
| CA | 2832185 A1 | 5/2014 |
| CA | 2846134 A1 | 9/2014 |
| MX | 2009011420 A | 3/2010 |
| MX | 2010001545 A | 8/2010 |
| WO | 2005086933 A2 | 9/2005 |
| WO | 2006028995 A2 | 3/2006 |
| WO | 2006028995 A3 | 2/2007 |
| WO | 2007146449 A2 | 12/2007 |
| WO | 2007146449 A3 | 10/2008 |
| WO | 2008121612 A1 | 10/2008 |
| WO | 2008144411 A1 | 11/2008 |
| WO | 2005086933 A3 | 12/2008 |
| WO | 2009021117 A1 | 2/2009 |
| WO | 2010047887 A2 | 4/2010 |
| WO | 2012162358 A1 | 11/2012 |
| WO | 2012162450 A1 | 11/2012 |
| WO | 2013078291 A1 | 5/2013 |
| WO | 2013138798 A1 | 9/2013 |

* cited by examiner

| TOP 10 FORD MODELS | Total # Test Drives | Test Drives Per Car |
|---|---|---|
| Ford F-150 | 929 | 7 |
| Ford Explorer | 389 | 8 |
| Ford Super Duty F-350 SRW | 370 | 11 |
| Ford Focus | 333 | 10 |
| Ford Escape | 330 | 7 |
| Ford Edge | 246 | 7 |
| Ford Mustang | 212 | 8 |
| Ford Flex | 200 | 18 |
| Ford Fusion | 154 | 7 |
| Ford C-Max Hybrid | 125 | 31 |

| BOTTOM 10 FORD MODELS | Total # Test Drives | Test Drives Per Car |
|---|---|---|
| Ford Fusion Energi | 76 | 11 |
| Ford Taurus | 71 | 12 |
| Ford Ranger | 68 | 23 |
| Ford Super Duty F-350 DRW | 61 | 12 |
| Ford C-Max Energi | 61 | 8 |
| Ford Expedition | 42 | 7 |
| Ford Transit Connect Van | 27 | 14 |
| Ford Transit Connect Wagon | 24 | 5 |
| Ford Transit Wagon | 23 | 12 |
| Ford Transit Van | 16 | 5 |

*FIG. 4*

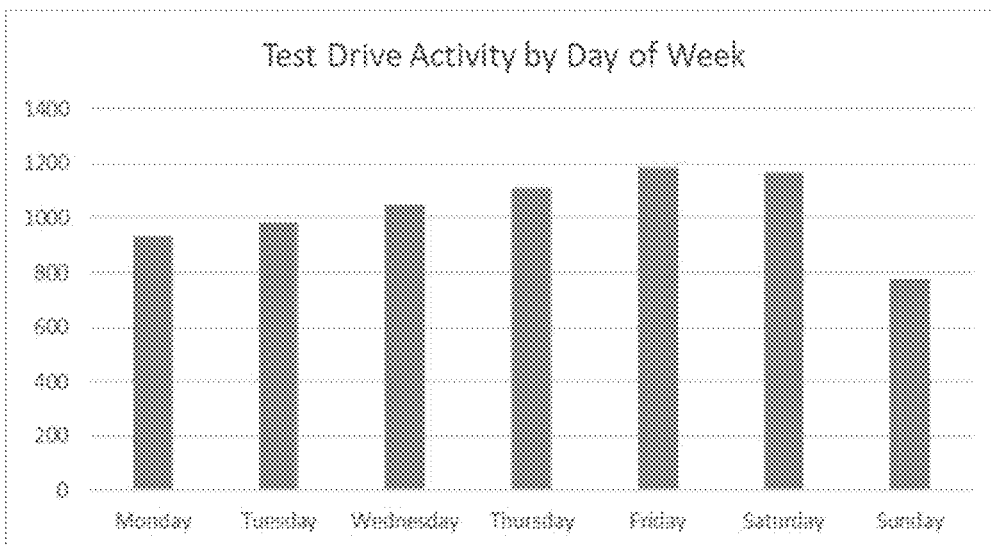

*FIG. 5*

MONITORING VEHICLE ACTIVITY AND COMMUNICATING INSIGHTS FROM VEHICLES AT AN AUTOMOBILE DEALERSHIP

RELATED APPLICATIONS

This application claims priority to U.S. provisional patent application Ser. No. 62/618,120, filed Jan. 17, 2018, titled MONITORING VEHICLE ACTIVITY AND COMMUNICATING INSIGHTS FROM VEHICLES AT AN AUTOMOBILE DEALERSHIP, the entire contents of which are incorporated herein by reference.

FIELD

This invention relates to the field of vehicle tracking. More particularly, this invention relates to a system for monitoring locations and movements of vehicles on dealership lot to make gain insights into vehicle sales activities.

BACKGROUND

In large car dealerships having one or more lots, finding a specific car among hundreds of cars is challenging. Furthermore, cars are constantly being moved and test driven, which makes it difficult to know whether any specific car is currently available, even if it normally resides on a known lot. Also, detailed vehicle health and activity information needs to be communicated to different stakeholders dependent on contextual clues, such as time of day, potential customer queue, and vehicle lifecycle state.

Current solutions rely on Global Positioning System (GPS) receivers and cellular and/or Wi-Fi modems to determine and communicate vehicle locations. However, in the context of a dealership lot, conventional GPS receivers and cellular modems draw significant current, leading to excessive battery consumption and prematurely drained vehicle batteries. A practical solution to this technical challenge should intelligently enable and disable GPS receivers and cellular modems while still gathering granular and subtle vehicle movement information for lot management and test drive detection. Embodiments described herein combine the use of an accelerometer to detect initial movement for powering on the appropriate systems, determining precise movement and location information through the use of GPS, and communicating this information via a cellular and/or Wi-Fi modem.

Furthermore, conventional systems generally track and report raw location information, which in itself does not distinguish between situations in which a vehicle is on a test drive, has been loaned for temporary use, or has been newly purchased and is driving off the lot. Embodiments described herein evaluate multiple signals, including motion, speed, heading, distance, and time, to uniquely distinguish test drives from general driving or movement behavior.

SUMMARY

Embodiments described herein include vehicle tracking devices installed in vehicles at a car dealership. The tracking devices utilize multiple sensors, including a GPS receiver for generating vehicle location data, and an accelerometer for generating vehicle motion data. Embodiments also include software applications installed on the smartphones of dealership sales representatives. Data from the vehicle tracking devices and data from the smartphone applications are received by a central server that uses the data to determine whether a vehicle is on a test drive, the identity of the salesperson who is with the vehicle, and the estimated time at which the vehicle will be returned to the dealership. Preferred embodiments establish a geofence around the dealership location, detect when vehicles exit and reenter the geofence, and communicate the exit/return event information back to the central server. The central server communicates the information to the smartphones of the dealership personnel to indicate the availability of a particular vehicle. Some embodiments also aggregate the information from multiple sensors to report on key metrics for optimizing dealer sales performance.

Preferred embodiments utilize the accelerometer, location data, and vehicle speed to determine that the car is in motion, along with the geofence exiting event and the elapsed time since exit to determine that a vehicle is on a test drive. Once the vehicle is known to be on a test drive, the vehicle tracking device communicates its state to the central server which flags the vehicle as "on test drive" so that the dealership personnel can determine the current status of any particular vehicle when they search for the vehicle via an electronic search on a mobile computer, desktop computer, or smartphone.

Test Drive and Associated Sales Personnel Detection

Some embodiments of the system correlate location and speed data from the smartphone of dealership sales representatives with location and speed data from a vehicle that is on a test drive to determine whether a sales representative is currently with the vehicle and to identify that sales representative. This correlation may also be communicated from the central server to the smartphones of other dealership personnel to provide the identity of the sales representative who is on the test drive. Alternatively, the dealership sales representative going on a test drive may explicitly record a check-out/check-in event through the mobile phone application and correlate that event to the specific vehicle.

In some preferred embodiments of the system, the central server calculates the estimated return time of a car on a test drive based on the known timestamp of a geofence exit event, the calculated average time of other test drives, the vehicle's current distance from the dealership, and the current status of traffic on surrounding streets which may be derived from traffic services. The estimated return time, the elapsed time, data on the test drive status, the identity of the dealership representative with the vehicle, and the vehicle's current location is communicated to dealership personnel who search for the vehicle using the central server.

Utilizing the same sensors and a geofence entry event, some preferred embodiments of the system detect the time at which the vehicle returns to the lot. This will subsequently result in the system communicating the vehicle status back to the central server. Once the status is updated, the central server distributes the information to the smartphones of relevant dealership personnel to inform them that the vehicle is out of test drive mode. In addition, any dealership representatives who searched for that vehicle during the test drive period will also receive a notification from the central server indicating that the car has returned.

In this regard, some embodiments provide an apparatus for managing information regarding an inventory of vehicles on a lot of an automobile dealership. The apparatus includes a plurality of vehicle tracking devices, each installed in a corresponding one of the vehicles. Each vehicle tracking device includes a location sensor and a wireless transceiver. The location sensor generates vehicle location information indicative of a geospatial location of the vehicle in which the vehicle tracking device is installed. The wireless transceiver communicates with a data communication network and transmits the vehicle location information via the data communication network. The apparatus includes a database for storing vehicle information regarding the vehicles in the inventory. The vehicle information for each vehicle includes the vehicle location information, test drive status information, and vehicle identification information. The apparatus also includes a central server in communication with the data communication network and the database. The central server executes instructions to:

determine based on the vehicle location information that a particular vehicle in the inventory has gone beyond a geofence boundary surrounding the lot of the automobile dealership;

determine one or both of:

that the vehicle has been in motion for at least a threshold period of time while beyond the geofence boundary, and that the vehicle has travelled at least a threshold distance while beyond the geofence boundary;

determine that the vehicle is on a test drive based on the vehicle:

having gone beyond the geofence boundary, and having been in motion for at least the threshold period of time or having travelled at least the threshold distance while beyond the geofence boundary; and update the test drive status information in the database to indicate that the vehicle is on a test drive.

In some embodiments, after determining that the particular vehicle is on a test drive, the central server executes instructions to generate a notification message for transmission via the data communication network for receipt by one or more mobile communication devices of salespersons employed by the automobile dealership. The notification message includes information indicating that the vehicle is on a test drive.

In some embodiments, the database stores salesperson information regarding salespersons employed by the automobile dealership. The salesperson information for each salesperson includes salesperson identification information and mobile device location information. The mobile device location information is indicative of a geospatial location of a mobile communication device of a salesperson. In these embodiments, the central server executes instructions to:

determine based on the vehicle location information and the mobile device location information that a mobile communication device of a particular salesperson is collocated with the vehicle; and update the test drive status information in the database to indicate that the salesperson is with the vehicle on a test drive:

In some embodiments, the central server executes instructions to:

determine based on the vehicle location information that the vehicle has returned to a location within the geofence boundary surrounding the dealership lot; and update the test drive status information in the database to indicate that the vehicle has returned from a test drive.

In some embodiments, after determining that the vehicle has returned from a test drive, the central server executes instructions to generate a notification message for transmission via the data communication network for receipt by one or more mobile communication devices of salespersons employed by the automobile dealership. The notification message includes information indicating that the vehicle has returned from a test drive.

In some embodiments, the data communication network is a Wi-Fi network or a cellular network, or a combination of such networks.

Test Drive Activities by Model

For car dealerships, test drive activity is a good early indicator of sales. Understanding various parameters of test drive activity helps car dealerships to plan and optimize their marketing and selling activities. Knowing which vehicles are test driven most and least provides insight into which vehicles are likely to be sold sooner. FIG. 4 depicts an example of data provided by an embodiment of the invention that indicates the top ten and bottom ten Ford models in terms of total test drives in a particular dealership during a three month period.

In the example of FIG. 4, the top/bottom ten Ford models are those with the most/least total number of test drives overall during the period. This metric is driven by the number of vehicles stocked for each model. For example, there may be 929 test drives of 142 Ford F-150 models, and 68 test drives of just three Ford Ranger models. To account for the difference in the number of vehicles stocked per model, embodiments of the invention provide the metric of "Test Drives Per Car" to provide insight into how many test drives occur on average per vehicle for a given model. Combined with sales data, this metric provides insights into conversion efficiency, which is the number of test drives it takes to convert a sale for each specific model.

In this regard, after determining that a certain vehicle has returned from a test drive, the central server executes instructions to increment a sum that indicates a number of test drives completed for all vehicles in the inventory having make and model information that matches make and model information for that certain vehicle. In some embodiments, the central server executes instructions to calculate a number of test drives per vehicle of each make and model by dividing the sum by the total number of vehicles of each make and model.

Test Drive Activities by Day of Week

Some embodiments described herein provide information indicating which day of the week is the busiest with respect to test drives at car dealerships. Tracking the trend of this metric month-after-month and year-after-year can provide insights into how seasonality, holidays, and industry cycles affect car dealerships. For example, as shown in FIG. 5, test drive data may indicate that Friday and Saturday are the busiest days for a particular dealership, while Sunday is the lightest day. Such data may also indicate that during a normal week, test drive activity gradually builds starting from Monday and peaks on Friday and Saturday.

In this regard, after determining that a certain vehicle has returned from a test drive, the central server executes instructions to increment a sum that indicates a total number of test drives completed for all vehicles in the inventory during a certain time period, such an hour, day, week, month, or year.

Other Vehicle Merchandizing Metrics

Additional vehicle merchandizing metrics may be derived using the combination of motion sensing, location sampling, and vehicle speed from the tracking device installed in the vehicle. Such data may also be correlated with location sampling and movement speed from the smartphone of a dealership sales representative. Based on this sensor data, embodiments of the invention provide insights into the vehicle purchasing process, including (1) which types of vehicles are of highest interest at particular points in time, (2) which sales representatives are most active and their times of highest activity, and (3) which vehicles are actually being sold, which may be determined based on location sampling, exit events from a dealership geofence, and the time of the exit events. Other metrics that may be derived include location(s) on a dealership lot where cars have the most test drive activities.

After-Hours Monitoring Mode

Some embodiments described herein enable the setup of an "after hours" mode, which is activated by a set of commands sent from a central server to devices on vehicles in the dealership lot. The in-vehicle devices receive the commands and provide signals to in-vehicle electronic switches to disable the starter ignition on all vehicles. The commands also configure the in-vehicle devices to generate alerts (email, SMS, and application push notifications) each night during hours that the dealership is closed for business. The alerts are triggered based on vehicle motion (accelerometer) and based on exiting the geofence associated with dealership lots. This combination of features provides a virtual alarm system that disables vehicles and notifies the appropriate personnel when there is unauthorized removal of vehicles from the lot during the designated after-hours time window.

In this regard, the central server of some embodiments executes instructions to:

receive an after-hours initiation message;

based on receipt of the after-hours initiation message, enter an after-hours mode;

receive vehicle location information;

determine based on the vehicle location information that a vehicle in the inventory has gone beyond a geofence boundary surrounding the dealership lot;

generate an alert message based on a determination that a vehicle in the inventory has gone beyond the geofence boundary; and send the alert message via the data communication network to a computing device of dealership personnel or a computing device of a security monitoring entity.

In some embodiments, each of the vehicle tracking devices includes a motion sensor that generates vehicle motion information indicative of movement of the vehicle in which the vehicle tracking device is installed, and the wireless transceiver transmits the vehicle motion information via the data communication network. In these embodiments, the central server executes instructions to:

receive the vehicle motion information;

determine based on the vehicle motion information that a vehicle in the inventory has experienced motion;

generate an alert message based on a determination that a vehicle in the inventory has experienced motion; and send the alert message via the data communication network to the computing device of dealership personnel or the computing device of the security monitoring entity.

In some embodiments, each of the vehicle tracking devices includes an ignition disable circuit for disabling an ignition of a vehicle in which the vehicle tracking device is installed. In these embodiments, the central server executes instructions to:

generate an ignition disable command based on receipt of the after-hours initiation message; and send the ignition disable command via the data communication network to one or more of the wireless transceivers of one or more of the vehicle tracking devices installed in one or more of the vehicles on the lot of the automobile dealership.

The wireless transceiver of each of the vehicle tracking devices receives the ignition disable command, and the ignition disable circuit disables the ignition of the vehicle in which it is installed.

Automated Key Distribution for Stacked Parking

When dealership personnel request a key for a specific car, some embodiments utilize up-to-date location data, and refresh the location data when needed by issuing a remote command to the in-vehicle device, to determine which cars are in the immediate vicinity that may be blocking movement of the specific target vehicle. Preferred embodiments provide a list of all the blocking vehicles for which the sales personnel should get keys in order to move those vehicles to allow movement of the target vehicle out of the lot. Furthermore, preferred embodiments utilize Bluetooth-beacon-enabled key tags that can communicate their approximate location through smartphone applications in use on the smart phones of dealer personnel.

In this regard, the central server of some embodiments executes instructions to:

receive a request message sent via the data communication network, wherein the request message includes information that identifies a target vehicle on the lot of the automobile dealership that needs to be moved;

based on information provided in the request message, access the database to acquire target location information that indicates a location on the lot of the automobile dealership where the target vehicle is parked;

based on the target location information, access the database to acquire vehicle identification information that identifies one or more adjacent vehicles that are parked in close proximity to the target vehicle;

based on the vehicle identification information that identifies the one or more adjacent vehicles, generate a list of the one or more adjacent vehicles; and send a response message via the data communication network that includes the list of the one or more adjacent vehicles.

In some embodiments, the response message is sent to one or more mobile communication devices associated with dealership personnel.

In some embodiments, the response message includes information needed to enable wireless communication between wireless-beacon-enabled key tags and the mobile communication devices associated with dealership personnel. The wireless-beacon-enabled key tags are attached to ignition keys that are needed to start the target vehicle and the adjacent vehicles.

In some embodiments, the wireless communication is enabled using a Bluetooth or another short-range wireless communication protocol.

In some embodiments, the response message includes location information indicating where the target vehicle and the adjacent vehicles are located on the lot of the automobile dealership.

In some embodiments, the response message includes key identification information for use by dealership personnel to identify ignition keys that are needed to start the target vehicle and the adjacent vehicles.

In some embodiments, the central server executes instructions to:

based on information provided in the request message, access the database to acquire vehicle identification information needed to send a command to the vehicle tracking device in the target vehicle;

send a location request command to the vehicle tracking device in the target vehicle;

receive current target location information transmitted from the vehicle tracking device in the target vehicle in response to the location request command, wherein the current target location information includes current location coordinates of the target vehicle; and based on the current target location information, access the database to acquire vehicle identification information that identifies the adjacent vehicles which vehicle location information indicates are parked in close proximity to the target vehicle.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein:

FIG. 4 depicts a listing of total number of test drives and test drives per vehicle of twenty different vehicles at a dealership generated by an embodiment of the invention;

FIG. 5 depicts a graph of total number of test drives per day for all vehicles at a dealership generated by an embodiment of the invention;

DETAILED DESCRIPTION

Figure 1:
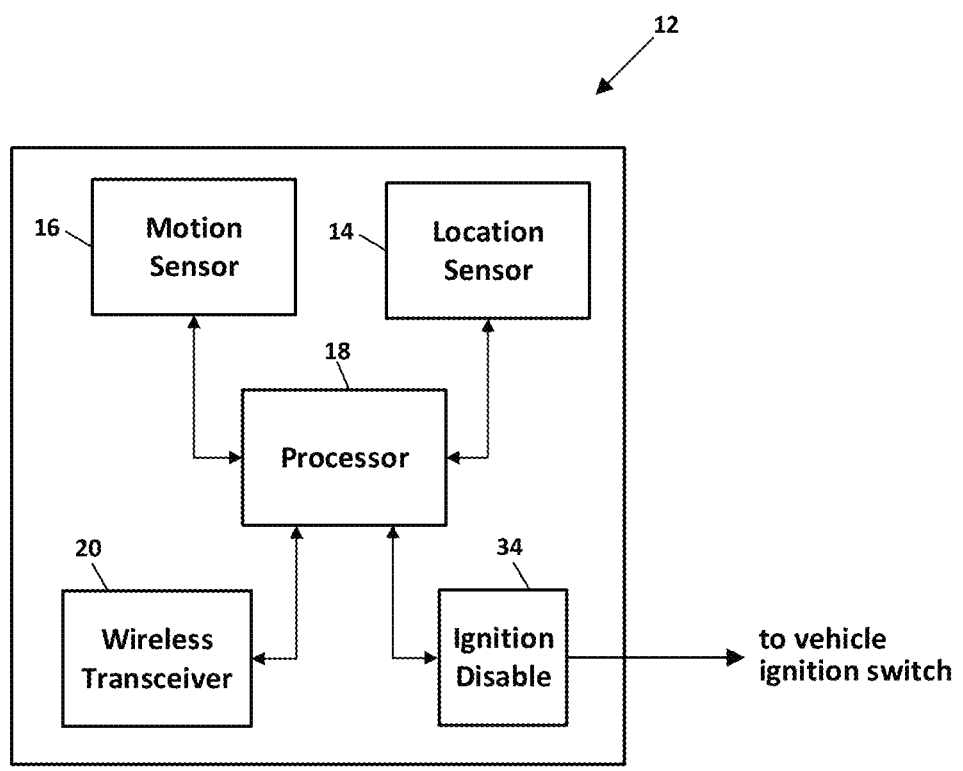
FIG. 1 depicts a vehicle tracking device according to an embodiment of the invention.

Various embodiments described herein incorporate vehicle tracking devices 12, an example of which is depicted in block diagram form in FIG. 1. A preferred embodiment of the vehicle tracking device 12 combines a location sensor 14, a motion sensor 16, a processor 18, a wireless transceiver 20, and an ignition disable circuit 34, all disposed within a small housing that may be installed beneath the dashboard of a vehicle, within the engine compartment, or in another location in the vehicle. The location sensor 14 is preferably a Global Positioning System (GPS) receiver that generates vehicle location coordinates based on timing signals from GPS satellites. The motion sensor 16 is preferably a single-axis or multiple-axis accelerometer that senses acceleration in one or more axes. The wireless transceiver 20 is preferably a cellular data transceiver for communicating data across a wireless communication network. The processor 18 executes commands for receiving information from the motion sensor 16 and the location sensor 14, for processing such information, and for providing processed information to the wireless transceiver 20 for communication via the network.

Figure 2:
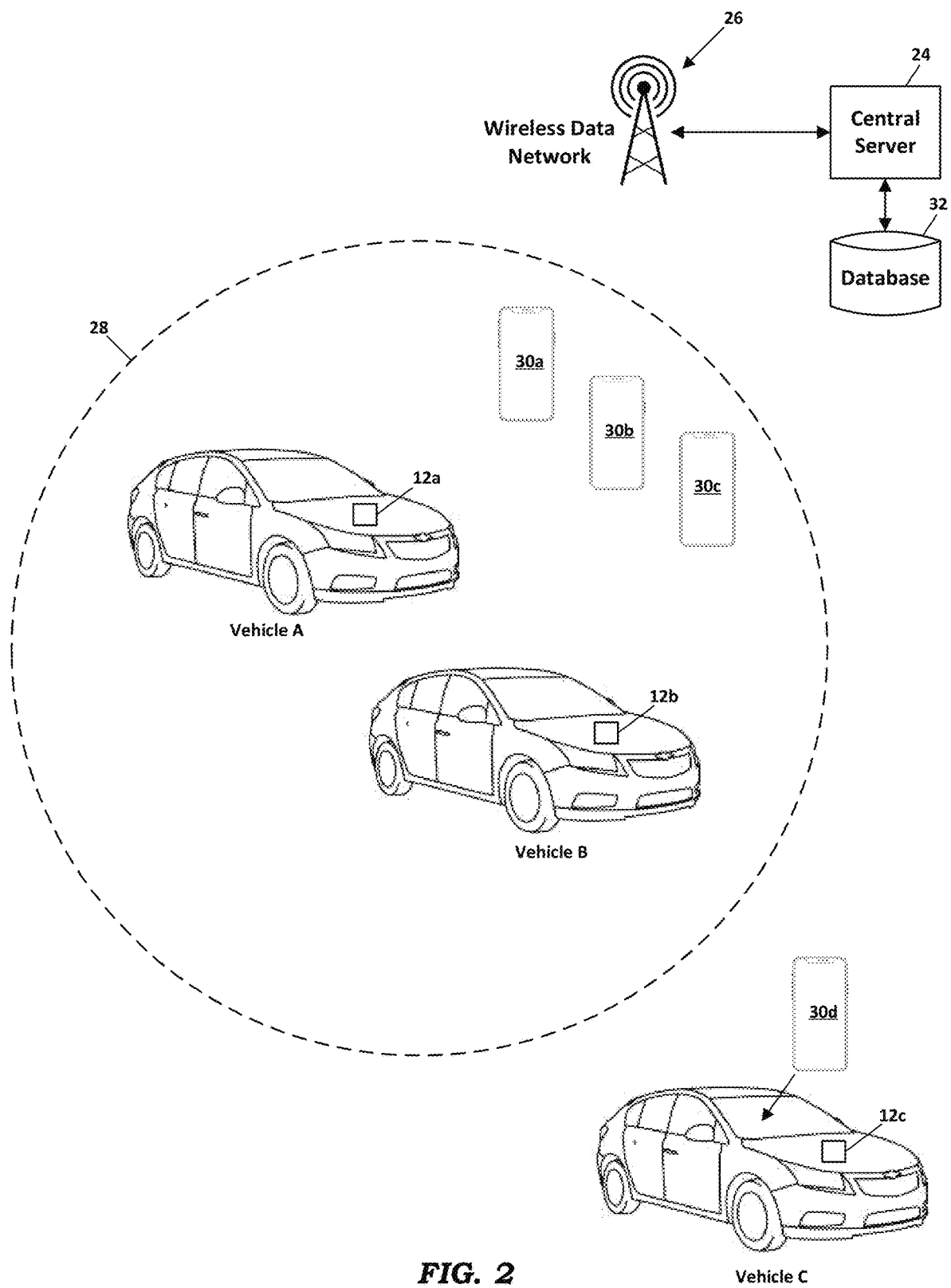
FIG. 2 depicts a system for determining a test drive status of a vehicle at a dealership according to an embodiment of the invention.

The vehicle tracking device 12 is preferably installed in a vehicle that is part of the inventory of an automobile dealership. For example, as shown in FIG. 2, a tracking device 12*a* is installed in Vehicle A, a tracking device 12*b* is installed in Vehicle B, and a tracking device 12*c* is installed in Vehicle C. The wireless transceivers 20 of each of the tracking devices 12*a*-12*c* communicate data via the wireless data network 26 to and from a central server 24. The central server 24 may be provided by the automobile dealership or by a vehicle tracking service provider entity. In a preferred embodiment of the system, each sales person working at the automobile dealership uses a mobile communication device 30*a*, 30*b*, 30*c*, or 30*d*, which may be a smartphone, for communicating data to and from the central server 24 via the data network 26.

As shown in FIG. 2, the system preferably includes a dealer inventory database 32 in communication with the central server 24. The database 32 includes information about each vehicle in the inventory of the dealership and information regarding dealership salespersons. This information preferably includes an identification number of each vehicle (such as its VIN), the make and model of each vehicle, the last-reported geographic coordinates of the location of the vehicle, the last-reported motion status of the vehicle (moving or stationary), the test drive status of the vehicle (on test drive or on dealer lot), an identification number for an ignition key for the vehicle, and information that identifies salespersons and indicates their current locations (as determined by the locations of their mobile communications devices 30*a*-30*d*).

Test Drive and Associated Sales Personnel Detection

According to some embodiments of the system, a vehicle has completed a "test drive" if the following three criteria are met:

the vehicle exits and returns to the dealership;

the vehicle is driven for from one minute to thirty minutes between the time it exited and the time it returned; and the vehicle is driven from one to fifteen miles from the dealership between the time it exited and the time it returned.

In some embodiments, a vehicle is designated as currently on a "test drive" if the following criteria are met:

the vehicle has exited the dealership and not returned to the dealership;

the vehicle has been in continuous motion for at least X minutes since exiting the dealership; and a salesperson is with the vehicle.

Although these criteria will cover most test drives, a very small portion of test drives may not meet these criteria. On the other hand, a small number of uses of a vehicle that are not test drives may also meet these criteria, such as getting gas or other such activities.

Figure 3:
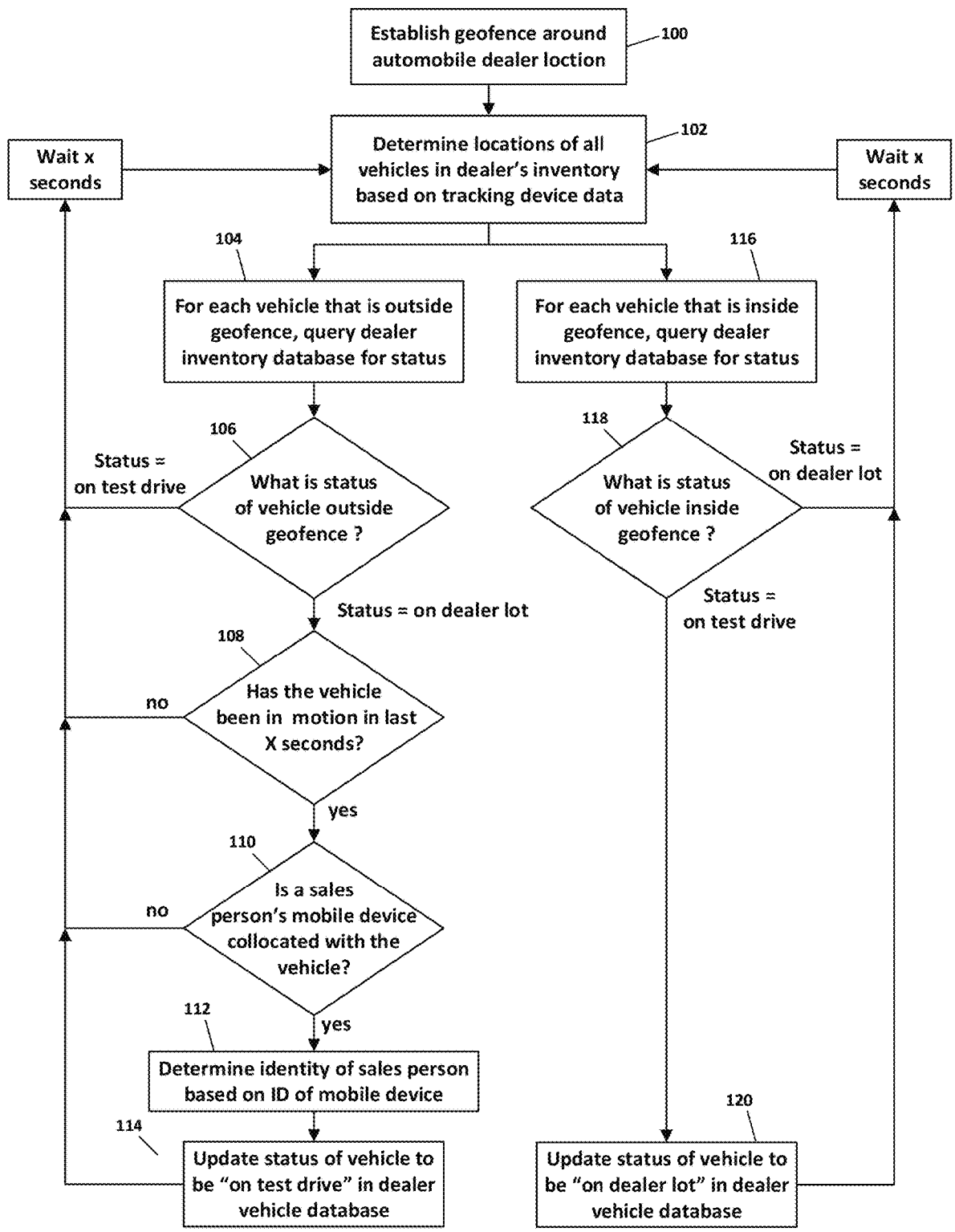
FIG. 3 depicts a process for determining a test drive status of a vehicle at a dealership according to an embodiment of the invention.

As shown in FIG. 3, a process for determining the test drive status of vehicles at an automobile dealership is performed based on software instructions carried out by various processing components in the central server 24, in the vehicle tracking devices 12*a*-12*c*, and in the mobile communication devices 30*a*-30*d*. An initial step in the process is to establish a geofence 28 around the automobile dealership (step 100). This geofence 28 is preferably a circular or other shaped boundary defined by a radius or other distance measurement stored in the central server 24. The size of the geofence 28 may be adjusted from time to time as necessary via commands provided to the central server 24 by dealership personnel.

Periodically, the geospatial location of each vehicle in the dealer inventory is determined (step 102). This location information is generated by the location sensors 14 of the tracking devices 12 in the vehicles and transmitted via the network 26 to the central server 24. The generation of the location information may be periodically triggered by software running in the processor 18 of the tracking device 12, or by commands sent periodically from the central server 24 via the network 26 to the tracking device 12. For each vehicle whose location information indicates it is outside the geofence 28 (such as Vehicle C in FIG. 2), the central server 24 queries the inventory database 32 to determine the current test drive status of Vehicle C (step 104). If the current status of Vehicle C is "on test drive," then no further action is needed at this time. If the current status of Vehicle C is "on dealer lot" (step 106), the central server 24 queries the database 32 to determine based on the motion status whether Vehicle C has been in motion in the last X seconds (step 108). In one preferred embodiment, X is 120 seconds. If Vehicle C has not been in motion in the last X seconds, then no further action is needed at this time. If Vehicle C has been in motion in the last X seconds, the current location of all salespersons' mobile communication devices 30a-30d are queried, and the central server 24 determines based on the location coordinates of the mobile devices 30a-30d and Vehicle C whether any of the mobile devices 30a-30d are collocated with Vehicle C (step 110). If no salesperson's mobile device 30a-30d is collocated with Vehicle C, then no further action is needed at this time. If a salesperson's mobile device 30a-30d is collocated with Vehicle C (such as mobile device 30d as shown in FIG. 2), the identity of the salesperson is determined by cross-referencing to the identification number of the collocated mobile device 30d (step 112). The central server 24 then updates the test drive status of Vehicle C as "on test drive" in the database 32 (step 114). At this point, any of the other salespersons may query the database 32 and determine that Vehicle C is on a test drive with the identified salesperson who has mobile device 30d.

Referring back to step 102, for each vehicle whose location information indicates it is inside the geofence 28 (such as Vehicle A in FIG. 2), the central server 24 queries the inventory database 32 to determine the current test drive status of such vehicle (step 118). If the current status of Vehicle A is "on dealer lot," then no further action is needed at this time. If the current status of Vehicle A is "on test drive," then the central server 24 updates the test drive status of Vehicle A to be "on dealer lot" in the database 32 (step 114). At this point, any of the other salespersons can query the database 32 and determine that Vehicle A has returned from a test drive and is now on the dealer lot. In some embodiments, when Vehicle A's test drive status changes from "on test drive" to "on vehicle lot," the central server 24 automatically generates a notification message that is pushed to the mobile communication devices 30a-30d of any and all salespersons who have entered a request for such notifications.

It should be noted that other vehicle status indicators could be set—other than or in addition to "on dealer lot" and "on test drive"—based on a vehicle being outside the geofence but not in motion (step 108), or outside the geofence and in motion but not collocated with a salesperson (step 112). These additional states may include "on loan" such as when a dealer has issued loaner car, or "at body shop" for vehicles that are in process of repair at an external service facility. Other states may include "at car wash" for vehicles that have been taken offsite for cleaning.

Test Drive Activities by Model

Using the vehicle tracking and test drive status update system described above, the total number of test drives and the average number of test drives for each make and model of vehicle may be determined and maintained in the database 32. For example, each time the test drive status of a vehicle having a particular make and model changes from "on vehicle lot" to "on test drive" and back to "on vehicle lot," the central server 24 increments a first sum that represents the total number of test drives associated with an identifier for that specific make and model that is stored in the database 32. The central server 24 determines the average number of test drives for each make and model of vehicle by dividing the first sum by the total number of vehicles in inventory of the particular make and model. For example, if there are 142 Ford F-150 models in inventory, and the first sum of test drives is 929 for Ford F-150's, then the average number of test drives per Ford F-150 in inventory is 6.5 which may be rounded to 7.

Test Drive Activities by Day of Week

Using the vehicle tracking and test drive status update system described above, the total number of test drives of any vehicle on each day of the week may be determined and maintained in the database 32. For example, each time the test drive status of a vehicle changes from "on vehicle lot" to "on test drive" and back to "on vehicle lot," and a timestamp associated with the event of coming back within the geofence 28 indicates that the day of the week is Sunday, then the central server 24 increments a daily sum in the database 32 that represents the total number of test drives for all vehicles that occurred on a Sunday. In a preferred embodiment, a daily sum is maintained in the database 32 for each day of the week, and the central server 24 is operable to generate a display of test drives per day of the week as shown in FIG. 5.

In some embodiments, the granularity of the test drive data may be increased by keeping sums for various incremental time periods during the day on any particular day of the week.

Other Vehicle Merchandizing Metrics

The vehicle tracking and test drive status update system described above may also be used to determine which salespersons are most active with respect to test drives and their times of highest activity. For example, each time the test drive status of a vehicle changes from "on vehicle lot" to "on test drive" and back to "on vehicle lot," and the location coordinates of a salesperson's mobile device 30a-30d indicates that the salesperson is collocated with the vehicle on the test drive, then the central server 24 increments a sum in the database 32 that represents the total number of test drives in which that particular salesperson has participated. This sum may be determined and reported for any length of reporting period, such as per day, per week, per month, or per year. This sum may also be kept for various incremental time periods during the day on any particular day of the week. In some embodiments, these sums for each salesperson may be determined and reported to sales managers to provide a gauge on how busy the sales staff is. These sums may also be used in competitive scenarios, in which awards and incentives are presented to salespersons having the highest numbers of test drives per scoring period.

The vehicle tracking and test drive status update system described above may also be used to identify locations on a dealership lot where the most test drive activities originate. For example, when it is determined that a particular vehicle has exited the dealership geofence 28 and the criteria is met for its status to be "on test drive," the central server 24 stores the location coordinates for the location at which the vehicle was most recently stationary (parked) for some minimum period of time before it exited the geofence 28. The central server 24 then determines that these location coordinates where the vehicle was parked are within a particular area in the dealership lot. The central server 24 then increments a test drive sum for that particular area. For example, each individual area in the dealership may encompass sixteen (4×4) or twenty-five (5×5) parking spaces within the lot, and test drive sums are determined and maintained in the database 32 for each individual area. Using these metrics, dealership management personnel may determine that high numbers of test drives originate in certain areas of the lot, regardless of the make/model of vehicles parked in that area. This knowledge may lead to a strategy for placing certain vehicle makes/models within that high-activity area to increase the chances of those vehicles being test driven.

After-Hours Monitoring Mode

Figure 6:
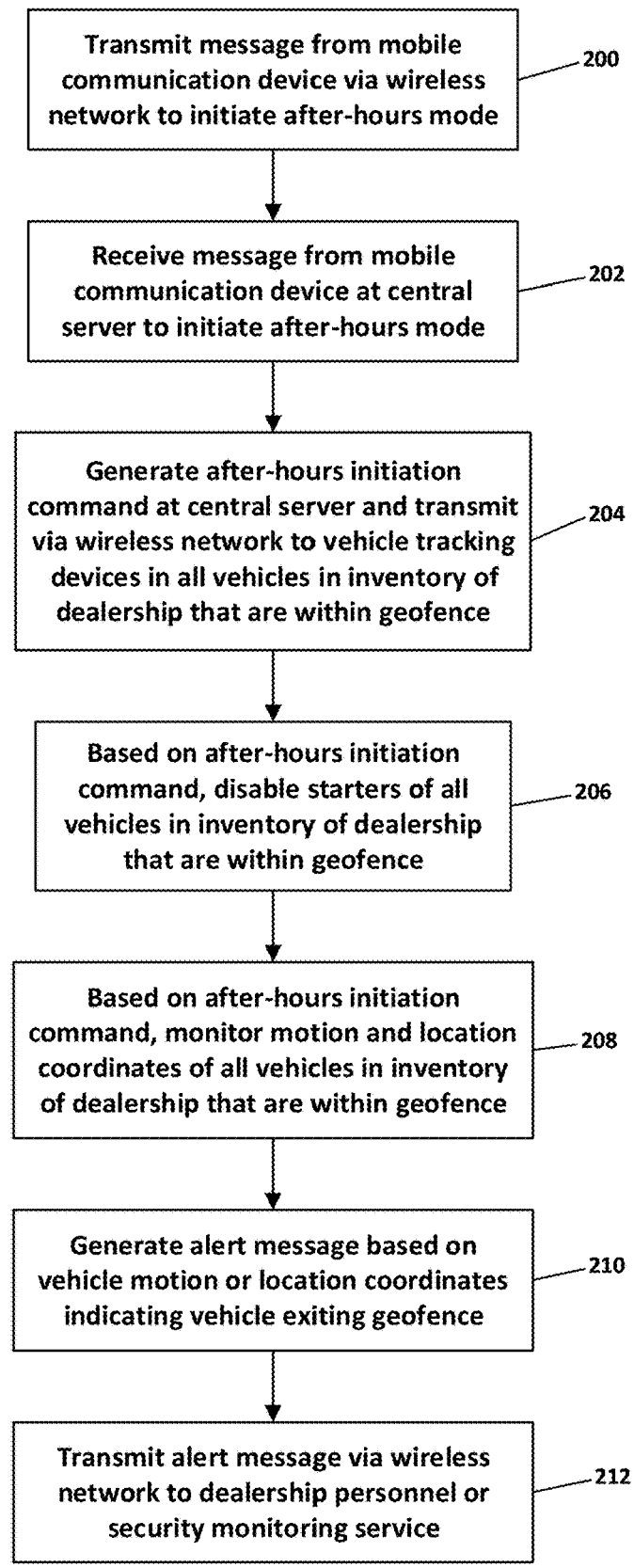
FIG. 6 depicts a process for implementing an after-hours mode for vehicles at a dealership according to an embodiment of the invention.

As depicted in FIG. 6, embodiments of the invention provide a process for an after-hours monitoring mode, in which vehicles in a dealership lot are monitored for unauthorized movement during periods of time in which the lot is not open for business. The after-hours mode may be initiated by a start message that is communicated via the communication network 26 to the central server 24 (step 200). This start message may be transmitted from a salesperson's mobile communication device 30a-30d or sent from another computer that is in communication with the network 26. In some embodiments, transmission of the start message is initiated automatically at a certain time of day, such as after closing time of the dealership. In other embodiments, it is initiated manually by dealership personnel.

Upon receipt of the start message (step 202), the central server 24 generates an after-hours initiation command which is transmitted via the wireless network 26 to vehicle tracking devices (such as 12a and 12b) installed in vehicles (such as Vehicle A and Vehicle B) that are in inventory of the dealership and located within the dealership geofence 28 (step 204). In the preferred embodiment, the after-hours initiation command is not sent to tracking devices installed in vehicles that are in inventory but not within the dealership geofence 28, such as vehicles that may be on overnight loan to dealership personnel. Upon receipt of the after-hours initiation command, the processor 18 of each tracking device:

causes the ignition disable circuit 34 to disable the vehicle ignition switch of the vehicle in which the tracking device is installed (step 206); and begins monitoring signals from the motion sensor 16 and the location sensor 14 to detect unauthorized movement of the vehicle (step 208).

If signals from the motion sensor 16 indicate movement of the vehicle, or if signals from the location sensor 14 indicate that the vehicle has moved outside the geofence 28, or both, the processor 14 generates an alert message (step 210), such as an email, an SMS text message, or an application push notification. The alert message is transmitted by the wireless transceiver 20 through the network 26 to notify the appropriate personnel that there has been an unauthorized removal of a vehicle from the lot during the designated after-hours time window (step 212).

Automated Key Distribution for Stacked Parking

Figure 7:
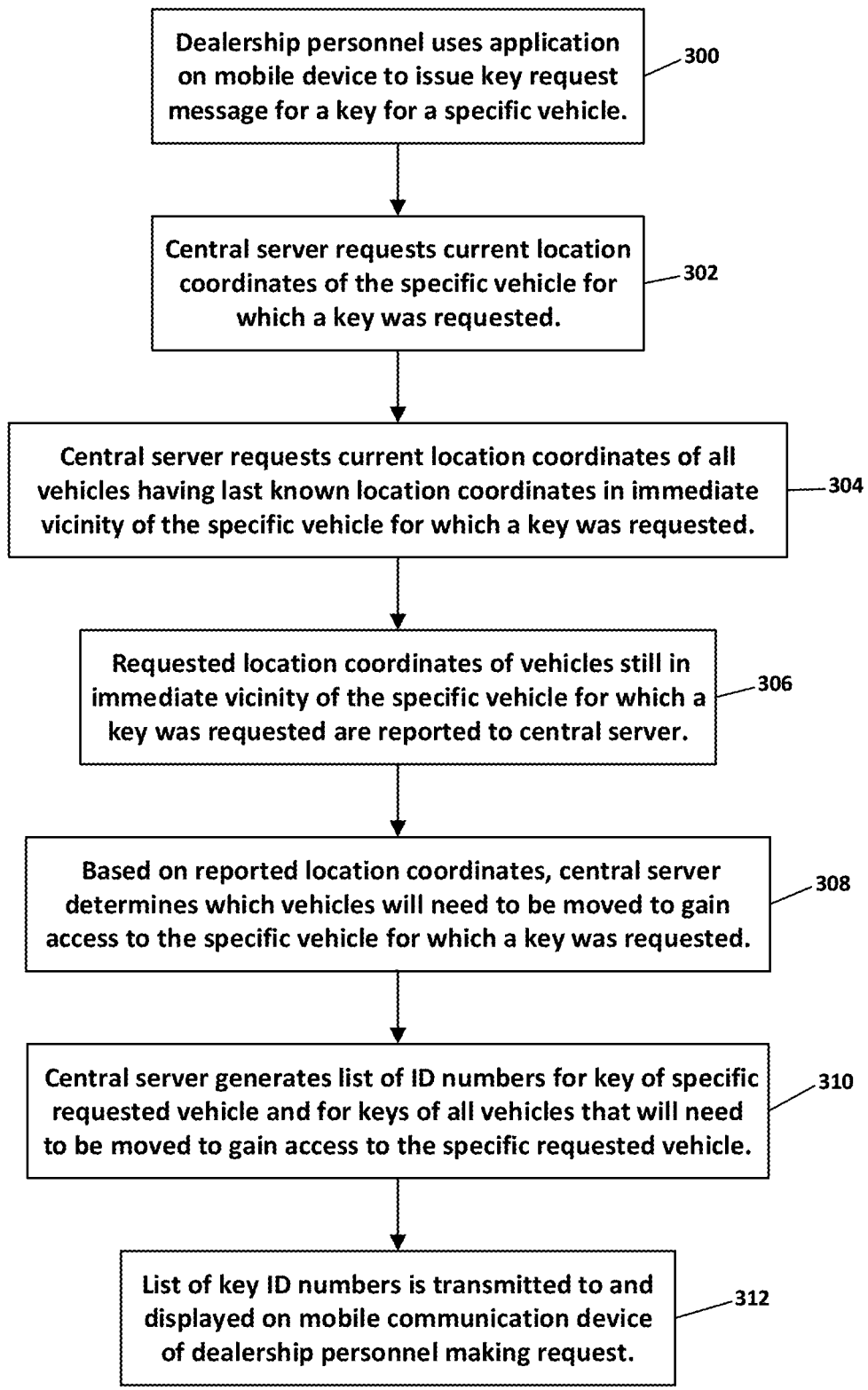
FIG. 7 depicts a process for generating a list of keys needed to move vehicles on a dealership lot to gain access to a specific target vehicle according to an embodiment of the invention.

As depicted in FIG. 7, embodiments of the invention provide a process for generating a list of keys that are needed to move vehicles on a dealership lot in order to gain access to a specific target vehicle. In the preferred embodiment, a dealership salesperson uses an application on the salesperson's mobile device 30a-30d to generate a key request message requesting a key for a specific target vehicle, such as a vehicle needed for a test drive (step 300). The key request message is transmitted from the mobile device 30a-30d via the communication network 26 to the central server 24. In response, the central server 24 generates a first location request message that is transmitted via the communication network 26 (step 302). The first location request message requests the current location coordinates of the specific target vehicle for which a key was requested.

The first location request message is received by the tracking device 12 installed in the target vehicle, and in response, the location sensor 14 of the tracking device 12 acquires its current location coordinates, and the wireless transceiver 20 transmits a first response message containing the current location coordinates. Based on the current location coordinates of the target vehicle and the previously recorded location coordinates of adjacent vehicles, the central server 24 determines from which of the adjacent vehicles updated location coordinates are needed. The central server 24 then transmits a second location request message that requests the current location coordinates of the vehicles that were determined to possibly be adjacent to the target vehicle based on their prior coordinates (step 304).

In response to the second location request message, the location sensors 14 of the tracking devices 12 in the adjacent vehicles acquire their current location coordinates, and the wireless transceivers 20 transmit second response messages containing the current location coordinates (step 306). Based on the reported current location coordinates from the vehicles in the vicinity of the target vehicle, the central server 24 determines which of those vehicles will need to be moved to gain access to the target vehicle (step 308). To account for potential GPS drift due to weak receiver signals, the central server 24 may discard geospatial data points that were determined with less than a threshold number of available GPS satellites, and then calculate a centroid of the remaining good historical data points to more precisely identify the location of each vehicle and it's relative location to the target vehicle. In a preferred embodiment, the central server 24 uses these calculated points to derive a virtual matrix map of the target vehicle and the immediate surrounding vehicles to recommend the vehicles that will need to be moved. Furthermore, the central server 24 preferably identifies the lack of vehicles in front or behind the target vehicle to determine how many adjacent vehicles need to be moved to get the target vehicle out.

The central server 24 then generates a list of identification numbers of the keys of all of the vehicles that will need to be moved, which list also includes the identification number of the key of the target vehicle (step 310). That key ID list is then transmitted via the communication network 26 to the mobile device 30a-30d that requested the list, and the list is displayed on the mobile device 30a-30d (step 312). Using the list, the salesperson can go collect the keys needed to gain access to and move the target vehicle.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for managing information regarding an inventory of vehicles on a lot of an automobile dealership, comprising:
a plurality of vehicle tracking devices, each installed in a corresponding one of the vehicles and comprising:
a location sensor for generating vehicle location information indicative of a geospatial location of a vehicle in which the vehicle tracking device is installed; and
a wireless transceiver for communicating with a data communication network and for transmitting the vehicle location information via the data communication network;
a database for storing vehicle information regarding the vehicles in the inventory, the vehicle information for each vehicle including the vehicle location information, test drive status information, and vehicle identification information; and
a central server in communication with the data communication network and the database, the central server for executing instructions to:
determine based on the vehicle location information that a first vehicle in the inventory has gone beyond a geofence boundary surrounding the lot of the automobile dealership;
determine one or both of:
that the first vehicle has been in motion for at least a threshold period of time while beyond the geofence boundary, and
that the first vehicle has travelled at least a threshold distance while beyond the geofence boundary;
determine that the first vehicle is on a test drive based on the first vehicle:
having gone beyond the geofence boundary, and
having been in motion for at least the threshold period of time or having travelled at least the threshold distance while beyond the geofence boundary; and
update the test drive status information in the database to indicate that the first vehicle is on a test drive.

2. The apparatus of claim 1 wherein, based on a determination that the first vehicle is on a test drive, the central server executes instructions to generate a notification message for transmission via the data communication network for receipt by one or more mobile communication devices of salespersons employed by the automobile dealership, wherein the notification message includes information indicating that the first vehicle is on a test drive.

3. The apparatus of claim 1 wherein:
the database stores salesperson information regarding salespersons employed by the automobile dealership, wherein the salesperson information for each salesperson includes salesperson identification information and mobile device location information, wherein the mobile device location information is indicative of a geospatial location of a mobile communication device of a salesperson; and
the central server executes instructions to:
determine based on the vehicle location information and the mobile device location information that a first mobile communication device of a first salesperson is collocated with the first vehicle; and
update the test drive status information in the database to indicate that the first salesperson is with the first vehicle on a test drive.

4. The apparatus of claim 1 wherein the central server executes instructions to:
determine based on the vehicle location information that the first vehicle has returned to a location within the geofence boundary surrounding the dealership lot; and
update the test drive status information in the database to indicate that the first vehicle has returned from a test drive.

5. The apparatus of claim 4 wherein, based on a determination that the first vehicle has returned from a test drive, the central server executes instructions to generate a notification message for transmission via the data communication network for receipt by one or more mobile communication devices of salespersons employed by the automobile dealership, wherein the notification message includes information indicating that the first vehicle has returned from a test drive.

6. The apparatus of claim 4 wherein:
the vehicle information stored in the database includes make and model information for each vehicle in the inventory; and
based on a determination that the first vehicle has returned from a test drive, the central server executes instructions to increment a sum indicating a number of test drives completed for all vehicles in the inventory having make and model information that matches make and model information for the first vehicle.

7. The apparatus of claim 6 wherein:
the vehicle information stored in the database includes a total number of vehicles in the inventory for each make and model; and
the central server executes instructions to calculate a number of test drives per vehicle of each make and model by dividing the sum by the total number.

8. The apparatus of claim 4 wherein, based on a determination that the first vehicle has returned from a test drive, the central server executes instructions to increment a sum indicating a total number of test drives completed for all vehicles in the inventory during a time period, wherein the time period is an hour or a day or a week or a month or a year.

9. The apparatus of claim 1 wherein the data communication network comprises one or more of a Wi-Fi network and a cellular network.

10. An apparatus for managing information regarding an inventory of vehicles on a lot of an automobile dealership, comprising:
a plurality of vehicle tracking devices, each installed in a corresponding one of the vehicles and comprising:
a location sensor for generating vehicle location information indicative of a geospatial location of a vehicle in which the vehicle tracking device is installed; and
a wireless transceiver for communicating with a data communication network and for transmitting the vehicle location information via the data communication network; and
a central server in communication with the data communication network and the database, the central server for executing instructions to:
receive an after-hours initiation message;
based on receipt of the after-hours initiation message; enter an after-hours mode;
receive the vehicle location information;
determine based on the vehicle location information that a vehicle in the inventory has gone beyond a geofence boundary surrounding the dealership lot;

if in the after-hours mode; generate an alert message based on a determination that a vehicle in the inventory has gone beyond the geofence boundary; and
send the alert message via the data communication network to a computing device of dealership personnel or a computing device of a security monitoring entity.

11. The apparatus of claim 10 wherein:
each of the plurality of vehicle tracking devices includes a motion sensor for generating vehicle motion information indicative of movement of a vehicle in which the vehicle tracking device is installed; and the wireless transceiver transmits the vehicle motion information via the data communication network; and
the central server executes instructions to:
receive the vehicle motion information;
determine based on the vehicle motion information that a vehicle in the inventory has experienced motion;
if in the after-hours mode; generate an alert message based on a determination that a vehicle in the inventory has experienced motion; and
send the alert message via the data communication network to the computing device of dealership personnel or the computing device of the security monitoring entity.

12. The apparatus of claim 10 wherein:
each of the plurality of vehicle tracking devices includes an ignition disable circuit for disabling an ignition of a vehicle in which the vehicle tracking device is installed;
the central server executes instructions to:
based on receipt of the after-hours initiation message, generate an ignition disable command; and
send the ignition disable command via the data communication network to one or more of the wireless transceivers of one or more of the vehicle tracking devices installed in one or more of the vehicles on the lot of the automobile dealership;
the wireless transceiver of each of the one or more vehicle tracking devices receives the ignition disable command; and
based on receipt of the ignition disable command, the ignition disable circuit of each of the one or more vehicle tracking devices disable the ignition of the one or more vehicles on the lot of the automobile dealership.

13. The apparatus of claim 10 wherein the data communication network comprises one or more of a Wi-Fi network and a cellular network.

14. An apparatus for managing information regarding an inventory of vehicles on a lot of an automobile dealership, comprising:
a plurality of vehicle tracking devices, each installed in a corresponding one of the vehicles and comprising:
a location sensor for generating vehicle location information indicative of a geospatial location of a vehicle in which the vehicle tracking device is installed; and
a wireless transceiver for communicating with a data communication network and for transmitting the vehicle location information via the data communication network;
a database for storing vehicle information regarding the vehicles in the inventory, the vehicle information for each vehicle including the vehicle location information and vehicle identification information; and
a central server in communication with the data communication network and the database, the central server for executing instructions to:
receive a request message sent via the data communication network, wherein the request message includes information that identifies a target vehicle on the lot of the automobile dealership that needs to be moved;
based on information provided in the request message, access the database to acquire target location information that indicates a location on the lot of the automobile dealership where the target vehicle is parked;
based on the target location information, access the database to acquire vehicle identification information that identifies one or more adjacent vehicles that are parked in close proximity to the target vehicle;
based on the vehicle identification information that identifies the one or more adjacent vehicles, generate a list of the one or more adjacent vehicles; and
send a response message via the data communication network, wherein the response message includes the list of the one or more adjacent vehicles.

15. The apparatus of claim 14 wherein the response message is sent to one or more mobile communication devices associated with dealership personnel.

16. The apparatus of claim 15 wherein the response message includes information needed to enable wireless communication between wireless-beacon-enabled key tags and the one or more mobile communication devices associated with dealership personnel, wherein the wireless-beacon-enabled key tags are attached to ignition keys that are needed to start one or more of the target vehicle and the one or more adjacent vehicles.

17. The apparatus of claim 16 wherein the wireless communication is enabled using a Bluetooth or other short-range wireless communication protocol.

18. The apparatus of claim 14 wherein the response message includes location information indicating where the target vehicle and the one or more adjacent vehicles are located on the lot of the automobile dealership.

19. The apparatus of claim 14 wherein the response message includes key identification information for use by dealership personnel to identify ignition keys that are needed to start one or more of the target vehicle and the one or more adjacent vehicles.

20. The apparatus of claim 14 wherein the central server executes instructions to:
based on information provided in the request message, access the database to acquire vehicle identification information needed to send a command to a vehicle tracking device in the target vehicle;
send a location request command to the vehicle tracking device in the target vehicle;
receive current target location information transmitted from the vehicle tracking device in the target vehicle in response to the location request command, wherein the current target location information includes current location coordinates of the target vehicle; and
based on the current target location information; access the database to acquire vehicle identification information that identifies the one or more adjacent vehicles which vehicle location information indicates are parked in close proximity to the target vehicle.

* * * * *